United States Patent [19]

Kervagoret

[11] Patent Number: 5,058,697
[45] Date of Patent: Oct. 22, 1991

[54] MODULATOR AND POWER-ASSISTED STEERING CIRCUIT CONTAINING SUCH A MODULATOR

[75] Inventor: Gilbert Kervagoret, Argenteuil, France

[73] Assignee: Bendix Europe Services Techniques, Drancy, France

[21] Appl. No.: 497,043

[22] Filed: Mar. 21, 1990

[30] Foreign Application Priority Data

Mar. 31, 1989 [FR] France .................. 89 04330

[51] Int. Cl.⁵ .............................................. B62D 5/06
[52] U.S. Cl. ........................................ 180/143; 137/501
[58] Field of Search ............... 180/132, 141, 142, 143; 137/596.12, 501

[56] References Cited

U.S. PATENT DOCUMENTS

| | | | |
|---|---|---|---|
| 2,255,787 | 9/1941 | Kendrick | 137/501 |
| 4,332,303 | 6/1982 | deMaight | 180/132 |
| 4,462,209 | 7/1984 | Thomsen et al. | 180/132 X |
| 4,561,521 | 12/1985 | Duffy | 180/142 |
| 4,609,331 | 9/1986 | Duffy | 180/142 X |
| 4,804,014 | 2/1989 | Francois | 137/501 |
| 4,850,390 | 7/1989 | Francois | 137/501 |

FOREIGN PATENT DOCUMENTS

0202154 11/1986 European Pat. Off. .
3514406 10/1985 Fed. Rep. of Germany .
2146032 2/1973 France .

Primary Examiner—Charles A. Marmor
Assistant Examiner—Kevin Hurley
Attorney, Agent, or Firm—Larry J. Palguta; Ken C. Decker

[57] ABSTRACT

The modulator is intended for diverting a specific quantity of fluid under high pressure from the supply circuit of a hydraulic motor for a power-steering of motor vehicles, comprising a body (48), a bore (50) in the body, a modulator slide (52) movable axially in the bore under the action of a control member (98), an inlet orifice (58) and a fluid outlet port (60) opening into the bore (50). The slide (52) has first and second bearing surfaces (82, 84) substantially of the diameter of the bore and separated by means of a narrowed section (86), opposite which the inlet orifice (58) opens out, the second bearing surface (84) controlling the outlet port (60). Furthermore, the slide (52) defines a first chamber arranged between the first and second bearing surfaces (82, 84) and second and third chambers arranged on either side of the slide (52) and communicating with one another. Finally, the outlet port (60) communicates with an intermediate chamber (70), in the side wall of which the outlet orifice (62) of the modulator opens out and which contains a regulator slide (72) controlling the outlet orifice (62) and moving counter to a spring (78) under the effect of the difference between the pressure prevailing in the first chamber and that prevailing in the intermediate chamber.

5 Claims, 2 Drawing Sheets

MODULATOR AND POWER-ASSISTED STEERING CIRCUIT CONTAINING SUCH A MODULATOR

BACKGROUND OF THE INVENTION

The invention relates to a modulator intended for diverting a quantity of fluid under high pressure from the fluid supply circuit of a hydraulic motor. It also relates to a power-assisted steering circuit for a motor vehicle, the assistance of which is a function of the speed of the vehicle, this circuit employing such a modulator.

The patent U.S. Pat. No. 4,561,521 makes known a power-assisted steering circuit of the abovementioned type, in which a modulator is used in order, at a high vehicle speed, to divert some of the assistance fluid under pressure towards the low-pressure fluid reservoir, so as to limit the assistance at high speed. This modulator consists of a simple piston controlled electrically and either closing or not closing an orifice for the discharge of the fluid towards the low-pressure fluid reservoir.

Such a modulator requires a bulky actuating device because one of the faces of the piston receives the pressurized fluid permanently.

Furthermore, it is known that, in power-assisted steering, it is desirable to keep the fluid flow constant at a given speed of the vehicle, in order to preserve the assistance characteristics. Now the modulator described in the abovementioned document does not perform any flow-regulating function.

U.S. Pat. No. 4,804,014 discloses a slide modulator performing a flow-regulating function. However, the side of this modulator receives the pressure of the diverted flow, which results in the requirement of a bulky actuating device and/or a limitation of the diameter of the slide.

SUMMARY OF THE INVENTION

The present invention overcomes these disadvantages. According to a first aspect, the invention relates to a modulator intended for diverting a specific quantity of fluid under high pressure from the supply circuit of a hydraulic motor, comprising a body, a modulator slide movable axially in the bore under the action of a control member, an inlet orifice and a fluid outlet port opening into the bore.

According to the invention, the slide has first and second bearing surfaces substantially of the diameter of the bore and separated by means of a narrowed section, opposite which the inlet orifice opens out, the second bearing surface controlling the outlet port; the slide defines a first chamber arranged between the first and second bearing surfaces and second and third chambers arranged on either side of the slide and communicating with one another; the outlet port communicates with an intermediate chamber, in the side wall of which the outlet orifice of the modulator opens out and which contains a regulator slide controlling the outlet orifice and moving counter to a spring under the effect of the difference between the pressure prevailing in the first chamber and that prevailing in the intermediate chamber. The second bearing surface preferably has a frusto-conical transition section.

According to one embodiment, the second and third chambers are connected to a low-pressure fluid reservoir, to which an exhaust orifice controlled by the first bearing surface can likewise be connected; a second inlet orifice can advantageously open into the bore between the first inlet orifice and the exhaust orifice.

The second inlet orifice can have a restriction.

According to a second aspect, the invention relates to a power-assisted steering circuit for a motor vehicle, the assistance of which is a function of the speed of the vehicle, comprising a source of fluid under high pressure, a valve controlling the admission of fluid under high pressure into an assistance device, a detector of the vehicle speed, an assistance control unit and a modulator intended for diverting a quantity of fluid under high pressure from the supply circuit of the assistance device.

According to the invention, the modulator conforms to the modulator described above; furthermore, the outlet orifice is connected to a low-pressure fluid reservoir, and the control member of the modulator slide consists of an electric motor controlled by the assistance control unit. Preferably, when the valve is a double-distribution valve, the outlet orifice of the modulator is connected to the reservoir by means of the second distribution with which the valve is equipped.

Advantageously, the modulator can also possess a detector of the position of the modulator slide, the output signal of which is applied to the assistance control unit in order to monitor a failure of the modulator.

BRIEF DESCRIPTION OF THE DRAWINGS

The invention will now be described by way of example with reference to the accompanying drawings in which.

DETAILED DESCRIPTION OF THE INVENTION

Figure 1:
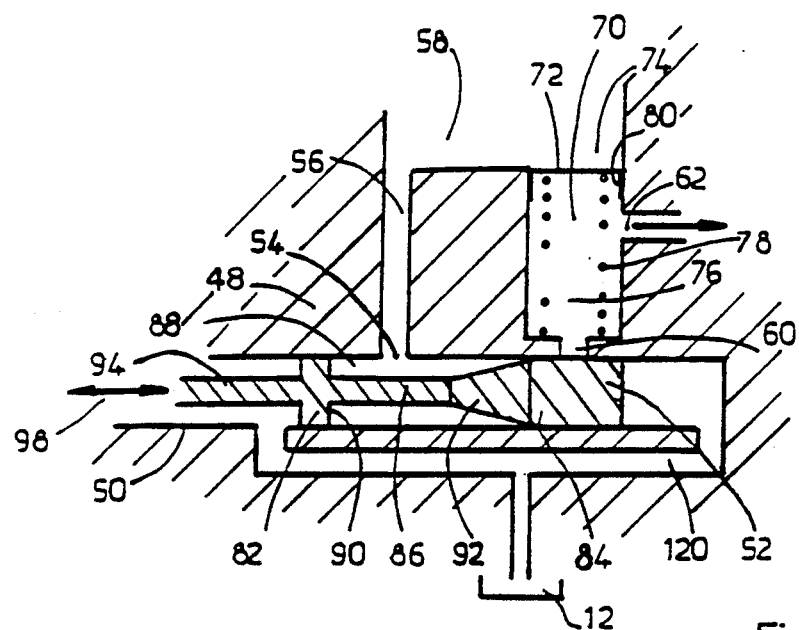
FIG. 1 shows a modulator according to the present invention diagrammatically in section.

Referring now to FIG. 1, the modulator comprises a body 48 pierced with a bore 50, in which a slide 52 slides.

An inlet orifice 58 is connected to the conduit, from which fluid under pressure is to be diverted, while the orifice 62 forms the outlet of the modulator. An inlet passage 56 connects the inlet orifice 58 to the bore 50 via an inlet port 54.

The outlet port 62 opens into the side wall of an intermediate chamber 70 containing a flow-regulating slide 72. The intermediate chamber 70 is divided into two parts by this slide 72: an upper part 74 in communication with the inlet orifice 58 and a lower part 76 in communication with the bore 50 via the port 60. The lateral skirt 80 of the slide is intended for closing or not closing the outlet orifice 62 as a function of the difference in the pressures prevailing in the parts 74 and 76 of the intermediate chamber, according to the rigidity of the spring 78 which stresses the slide towards the upper part.

The modulator slide 52 has two bearing surfaces 82, 84 of the same diameter, sliding in the bore 50 and separated by means of a narrowed section 86, thus defining a first chamber 88.

The bearing surface 82 located in the vicinity of the inlet port 54 is separated from the narrowed section 86 by means of a substantially planar radial shoulder 90, while the other bearing surface 84 located in the vicinity of the outlet port 60 is separated from the narrowed section 86 by means of a frustoconical transition section 92.

The slide terminates in an actuating rod 94 fixed to a drive member 98 intended for moving the slide 52 axially in the bore 50, as will be seen later.

Thus defined on either side of the two bearing surfaces are two chambers which communicate with one another via a conduit 120. Since the pressures exerted are balanced in this way, the drive member 98 of the modulator slide need not exert a high force in order to move the slide 52.

Figure 2:
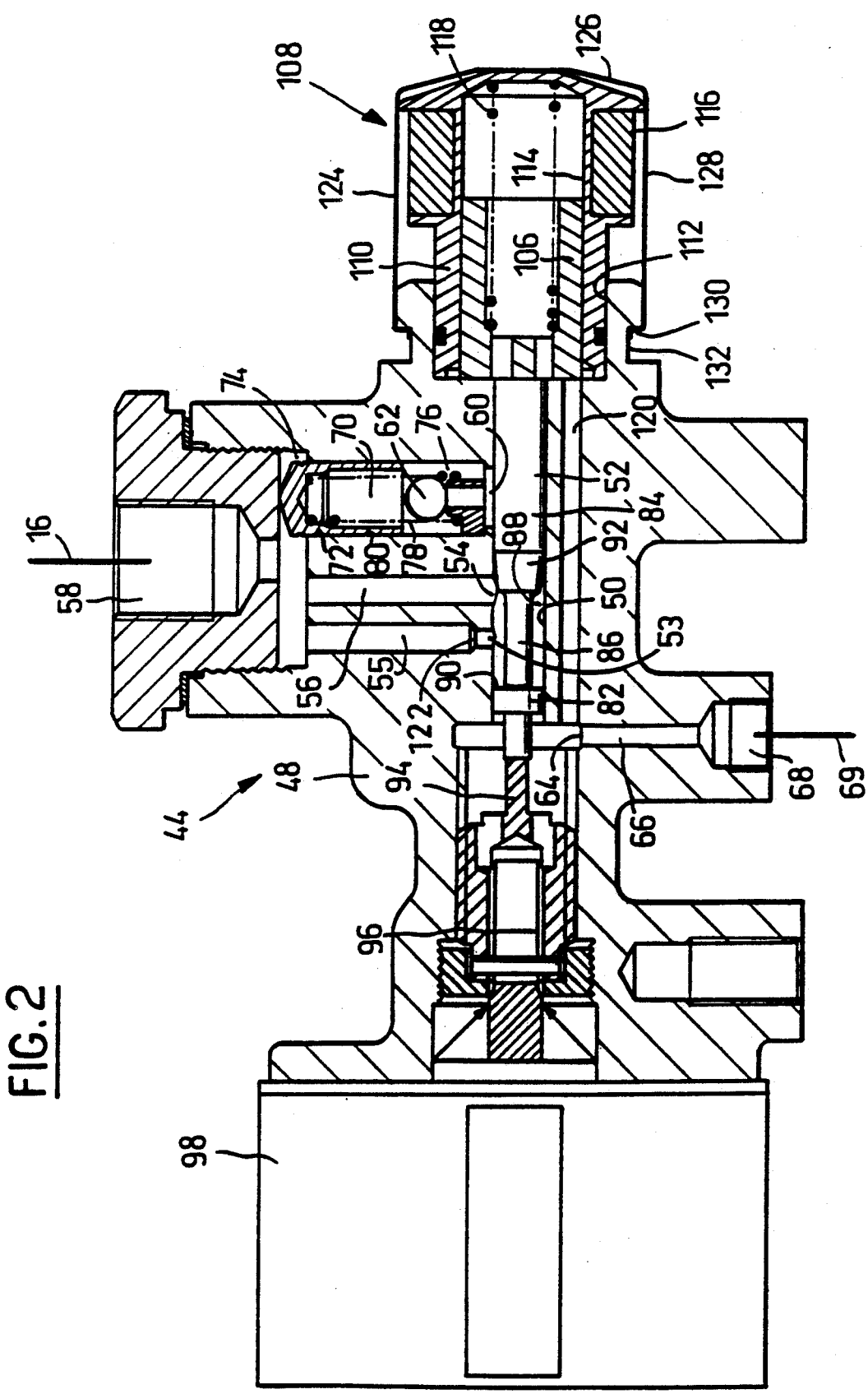
FIG. 2 shows a practical embodiment of the modulator of FIG. 1 in section.

FIG. 2 illustrates a practical embodiment of the modulator of FIG. 1. The references used remain identical, of course. It will be seen here that a second inlet port 53, likewise open towards the bore 50 and on the left of the first inlet port 54, as seen in the Figure, is connected to the inlet orifice 58 via a second passage 55 equipped with a throttle 122.

A discharge port 64, offset axially to the left in relation to the second inlet port 53, is connected, by means of a discharge passage 66, to a discharge orifice 68 connected to the low-pressure fluid reservoir 12 (FIG. 3) via a conduit 69.

The drive member, which is an electric motor 98 associated with a device of the screw/nut type 96, is connected to a control unit 100 (FIG. 3), itself connected to a current source 102 and to speed sensors 104, for example associated with the wheels of the vehicle or with a member connected to these.

Beyond the bearing surface 84, the modulator slide interacts with a core 106 of a position detector 108, of the inductive type in this embodiment.

The detector comprises a substantially cylindrical sleeve 110 fastened in a receptacle 112 of the modulator body 48 and defining an inner passage 114, in which the core 106 moves, and a stationary detector coil 116 surrounding the sleeve 110.

The core is kept in contact with the end of the slide 52 by means of a spring 118.

The coil is also connected to the control unit 100.

Figure 3:
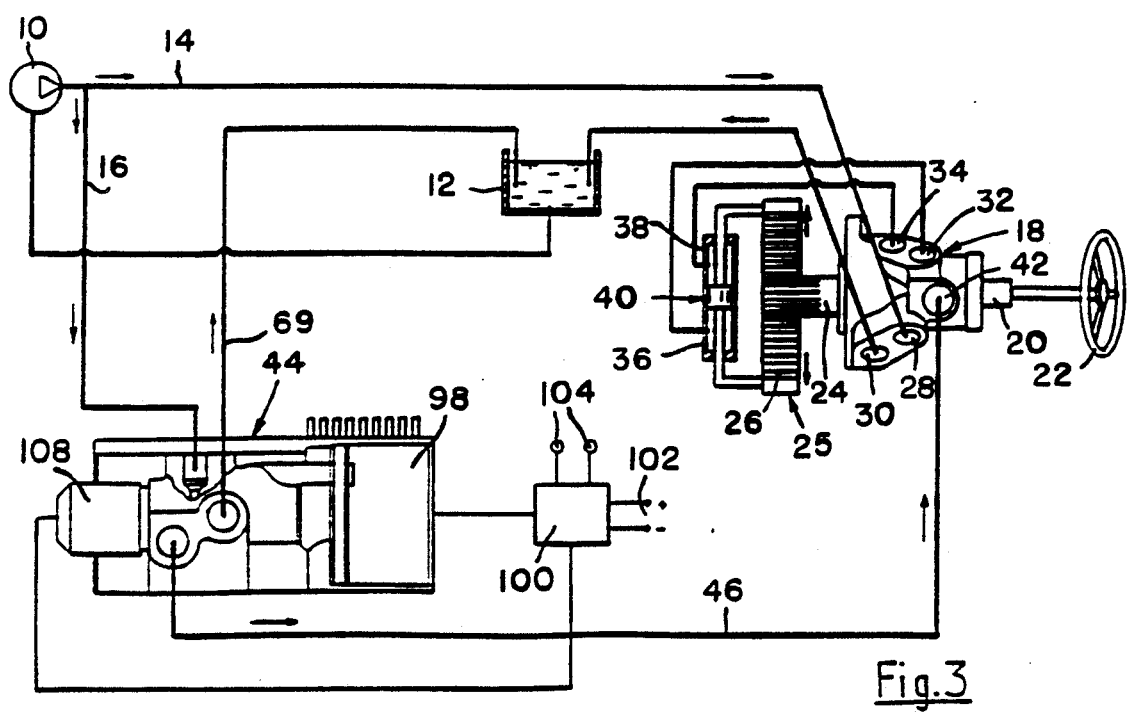
FIG. 3 illustrates diagrammatically a power-assisted steering circuit according to the invention.

The power-assisted steering circuit illustrated in FIG. 3 comprises a pump 10 drawing fluid from a low-pressure reservoir 12 and delivering it to pipelines 14, 16.

The first pipeline 14 serves a rotary power-assisted steering valve 18 of the double-distribution type in the example described here.

It will be recalled here briefly that the rotary valve 18 comprises a mechanical input member 20 connected to the steering wheel 22 of the vehicle and a mechanical output member 24 connected to the wheel-steering mechanism 25 shown partially in FIG. 3.

In the example illustrated, the mechanical output member 24 consists of a pinion meshing with a rack 26 of the steering mechanism and driving the latter to and fro according to the rotation imparted to the steering wheel 22.

The mechanical input and output members 20 and 24 of the valve 18 control valve elements mounted rotatably in the valve body.

These valve elements (not shown) control a first distribution between the inlet orifice 28, at which the high-pressure pipeline 14 ends, an exhaust orifice 30 connected to the low-pressure reservoir 12 and two right and left control orifices 32, 34 connected respectively to the two right and left chambers 36, 38 of a double-acting jack 40 mounted parallel to the rack 26.

When the mechanical input and output members 20 and 24 of the valve occupy a neutral position relative to one another, the control orifices 32, 34 are at equal pressures, as are the jack chambers 36, 38, so that the jack 40 exerts no assistance force on the rack 26.

In contrast, any relative angular offset of one of the mechanical input and output members 20 and 24 in relation to the other causes an imbalance of the pressures at the control orifices 32, 34 and consequently in the jack chambers, so that the jack 40 exerts an assistance force on the rack 26.

The valve elements on the other hand control a second distribution between an admission orifice 42, likewise connected to the delivery of the pump 10 via the second pipeline 16, a modulator 44 and a pipeline 46, and the return orifice 30 connected to the reservoir 12.

The function of this second distribution is to provide a permanent leakage passage from the admission orifice 42 towards the return orifice 30 and thereby reduce, at rest, the flow of fluid admitted by the main pipeline 14 towards the first distribution and consequently reduce the assistance, and progressively to throttle this leakage passage when the mechanical input and output members 20 and 24 are offset angularly relative to one another on either side of a neutral position, that is to say during actions on the steering, and thereby increase the pressure of the fluid admitted towards the first distribution and consequently increase the assistance.

The modulator 44 is interposed on the pipeline 16 diverting towards the second distribution.

The circuit and the modulator function as follows:

At zero or low speed, the control unit 100 actuates the motor 98 in order to bring the slide 52 into the position shown in FIG. 2. The bearing surface 82 is located substantially between the inlet port 54 and the discharge port 64, while the other bearing surface 84 closes the outlet port 60.

There is therefore no flow of fluid in the modulator 44 and consequently in the second distribution of the power-steering valve 18.

The entire delivery of the pump 10 therefore passes through the first distribution of the valve 18, and the actions on the steering wheel 22 result in high assistance on the steering mechanism 26 by means of the jack 40.

The detector 108 detects the position of the slide 52 and the control unit 100 checks whether this position corresponds to that obtained from the signal sent to the motor 98 by the control unit 100.

When the speed increases, the control unit 100 triggers the functioning of the motor 98 in order to move the slide 52 progressively to the right in FIG. 2.

The bearing surface 82 of the slide 52 moves nearer to the inlet ports 53 and 54, but still keeping communication between the inlet ports 53 and 54 and the discharge port 64 cut off.

The other bearing surface 84 moves to the right, until the frustoconical transition zone 92 comes opposite the outlet port 60, thereby making communication between the inlet port 54 and the outlet port 60 via the first chamber 88 surrounding the narrowed central section 86 of the core, this communication being throttled to a greater or lesser extent according to the axial position of the frustoconical position 92 opposite the outlet port 60.

A stream of fluid therefore occurs from the inlet port 54 to the outlet port 60 and then from the latter to the outlet orifice 62 via the lower part 76 of the intermediate chamber. The flow of this stream of fluid is set by the regulator as a function of the position of the slide 52 in the bore 50, independently of the upstream and downstream pressures established in the pipelines 16 and 46.

The flow delivered by the pump 10 is therefore diverted progressively by the modulator 44 towards the second distribution of the valve 18, thus proportionally reducing the flow admitted towards the first distribution.

As already described, the assistance controlled by the first distribution decreases, while in response to more pronounced actions on the steering mechanism, the throttles brought about in the second distribution result in a pressure increase in the first distribution and therefore a correlative increase in the assistance.

By means of the modulator 44, the flow supplied to the second distribution of the valve 18 remains constant for a given position of the slide 52, whatever the throttling of the internal orifices of this second distribution.

Here too, the detector 108 detects the position of the slide 52, and the control unit 100 checks whether it corresponds to that obtained as a result of the control signal sent to the motor 98.

When the speed exceeds a specific threshold, via the motor 98 the control unit 100 effects an additional axial movement of the slide 52 to the right, into a position where the bearing surface 82 goes beyond the second inlet port 53, thus making communication between the inlet port 53 and the discharge port 64.

A predominant part of the fluid delivered by the pump 10 is consequently diverted directly towards the reservoir 12, so that only a small part of this flow is admitted to the power-assisted steering valve 18 in order to ensure minimum assistance.

A calibrated restriction 122 interposed in the second inlet passage 55 makes it possible to predetermine the proportion of the flow thus diverted directly towards the reservoir 12.

When the speed decreases, the control unit 100 triggers the movement of the slide 52 in the opposite direction, and the same operating phases as described previously, in reverse order, are seen.

If the control unit 100 determines that the position signal for the slide 52 sent by the coil 116 does not correspond to the position assigned by the motor 98, it then compulsorily activates the latter in order to move the slide 52 to the right into the position of minimum assistance, until the repair of the defective member which has caused the failure.

The embodiment of the position detector 108 in the form of a sleeve 110 which is simply engaged on the modulator body 48 and contains the detector core 106 and which is surrounded by the detector coil 116 is especially simple and economical.

It is retained on the body 48 by means of a U-shape elastic stirrup 124, the base 126 of which is laid against the end of the sleeve 110 and the wings 128 of which terminate in pins 130 snapped into depressions 132 of the modulator body.

Moreover, the modulator 44 is sealed by means of simple static gaskets.

In fact, there is no need to provide gaskets on the slide 52.

Furthermore, the pressure prevailing in the two chambers at each end of the bore 50 of the slide is that of the reservoir, thus making only relatively simple gaskets necessary.

What we claim is:

1. A modulator intended for diverting a specific quantity of fluid under high pressre from a supply circuit of a hydraulic motor, comprising a body, a bore in said body, a first inlet orifice and a fluid outlet port opening into said bore, a modulator slide movable axially in said bore under the action of a control member and having first and second bearing surfaces substantially of the diameter of the bore and separated by means of a narrow section opposite which said first inlet orifice opens, said second bearing surface controlling said outlet port, said slide further defining a first chamber arranged between said first and second bearing surfaces and second and third chambers arranged on either side of said slide and communicating with one another, the outlet port communicating with an intermediate chamber having a side wall in which an outlet orifice of said modulator opens and the intermediate chamber containing a regulator slide controlling said outlet orifice and moving counter to a spring under the effect of a difference between pressure prevailing in said first chamber and pressure prevailing in said intermediate chamber, said second and third chambers being connected to a low-pressure fluid reservoir, the modulator further comprising an exhaust orifice controlled by said first bearing surface and connected with said low-pressure fluid reservoir, and a second inlet orifice opening into said bore between the first inlet orifice and said exhaust orifice.

2. The modulator of claim 1, wherein said second bearing surface has a frustoconical transition section.

3. The modulator of claim 1, wherein said second inlet orifice has a restriction.

4. A power-assisted steering circuit for a motor vehicle, an assistance of which is a function of vehicle speed, comprising a source of fluid under high pressure serving a power steering valve in an assistance device, a detector of vehicle speed, a control unit for said assistance and a modulator intended for diverting a quantity of fluid under high pressure from a supply circuit of said assistance device, said modulator comprising a body, a bore in said body, an inlet orifice and a fluid outlet port opening into said bore, a modulator slide movable axially in said bore under the action of a control member and having first and second bearing surfaces substantially of the diameter of the bore and separated by means of a narrowed section opposite which said inlet orifice opens, said second bearing surface controlling said outlet port, said slide further defining a first chamber arranged between said first and second bearing surfaces and second and third chambers arranged on either side of said slide and communicating with one another, the outlet port communicating with an intermediate chamber having a slide wall in which an outlet orifice of said modulator opens and the intermediate chamber containing a regulator slide controlling said outlet orifice and moving counter to a spring under the effect of a difference between pressure prevailing in said first chamber and pressure prevailing in said intermediate chamber, said outlet orifice being connected to a low-pressure fluid reservoir by means of a second distribution with which said steering valve is equipped, and the control member of said modulator slide comprising an electric motor controlled by said control unit.

5. The circuit according to claim 4, wherein said modulator further comprises a detector of position of the modulator slide, an output signal of which is applied to said control unit.

* * * * *